Figure 1:
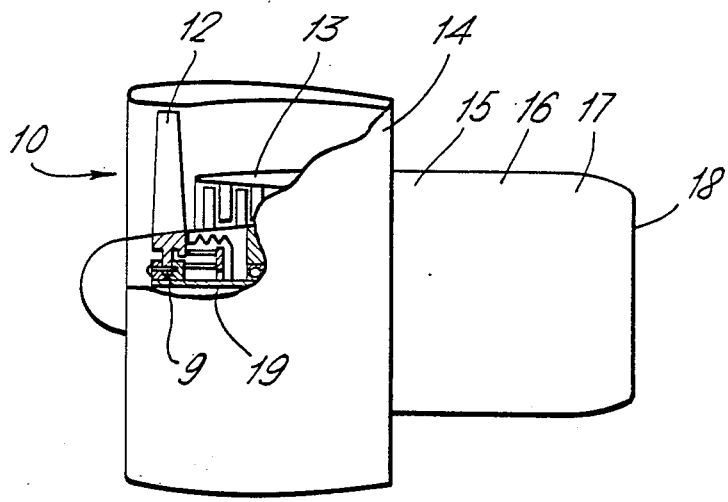

United States Patent [19]
Briggs

[11] 4,193,741
[45] Mar. 18, 1980

[54] GAS TURBINE ENGINES

[75] Inventor: Henry R. Briggs, Bristol, England

[73] Assignee: Rolls-Royce Limited, London, England

[21] Appl. No.: 893,817

[22] Filed: Apr. 5, 1978

Related U.S. Application Data

[62] Division of Ser. No. 748,371, Dec. 7, 1976, abandoned.

[51] Int. Cl.$^2$ ............................................. F01D 5/10
[52] U.S. Cl. ............................ 416/170 R; 416/174; 416/204 A; 60/39.09 R; 60/226 R
[58] Field of Search ............ 60/226 A, 226 B, 226 R, 60/262, 39.31, 39.32, 39.75, 39.09 R; 415/9, 77, 79; 416/2, 170 R, 174, 204 A, 210 A

[56] References Cited

U.S. PATENT DOCUMENTS

| | | | |
|---|---|---|---|
| 2,804,323 | 8/1957 | Morley | 416/204 A |
| 4,022,540 | 5/1977 | Young | 416/2 |

FOREIGN PATENT DOCUMENTS 1458532  12/1976  United Kingdom .................. 60/226 R

*Primary Examiner*—Robert E. Garrett
*Attorney, Agent, or Firm*—Stevens, Davis, Miller & Mosher

[57] ABSTRACT

A mounting arrangement for the fan rotor of a ducted fan engine includes a first drive which supports and rotates the fan under normal operating conditions but which includes a frangible connection which breaks when an excessive out-of-balance force is applied to the fan rotor for example after loss of one or more blades. A second supporting and driving structure is provided which has built-in transverse flexibility but which can transmit torque. This structure is redundant during normal operation of the engine but comes into use when the frangible connection is broken and allows the fan rotor to rotate eccentrically around a new axis in an inverted condition.

3 Claims, 4 Drawing Figures

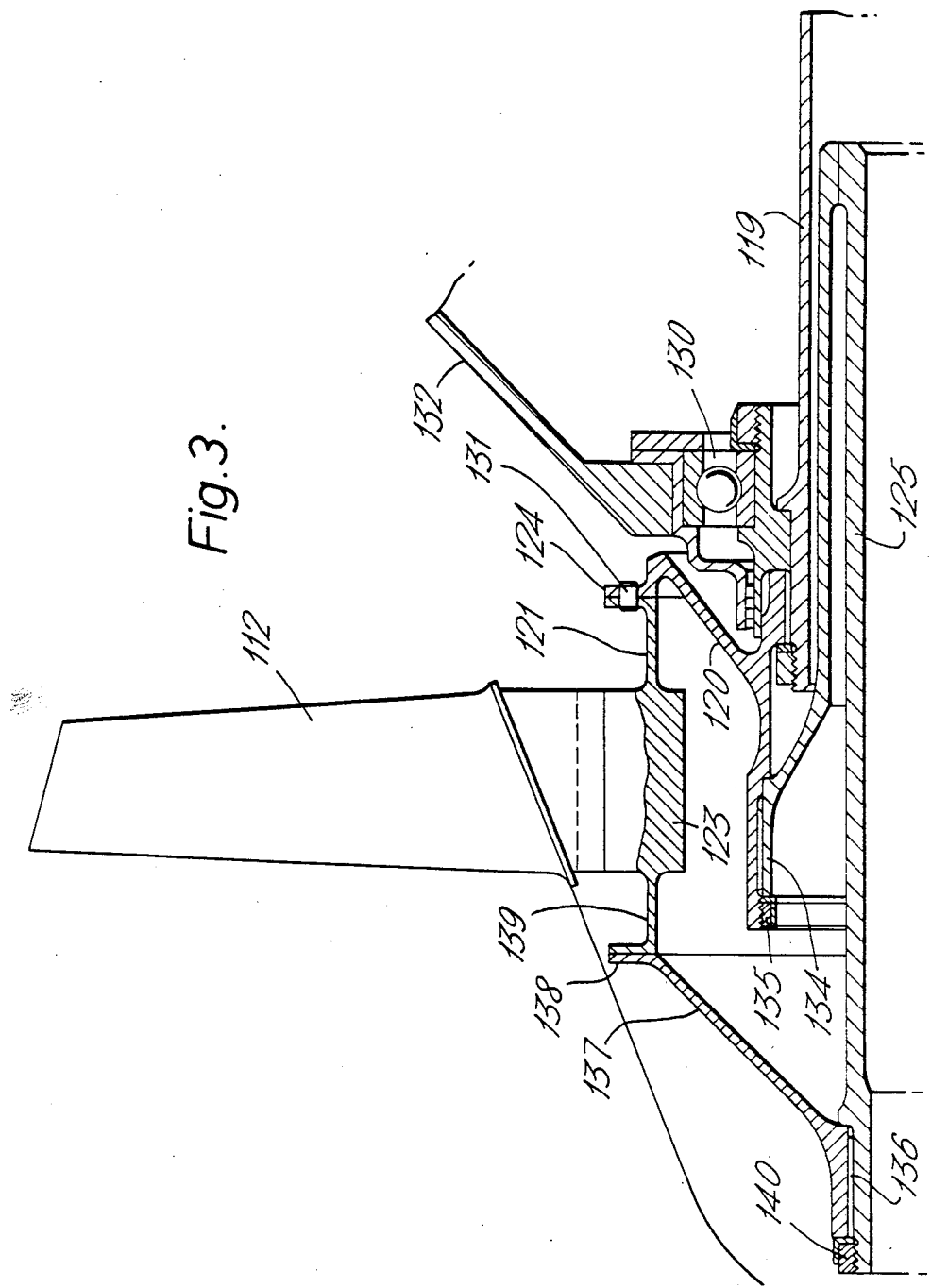

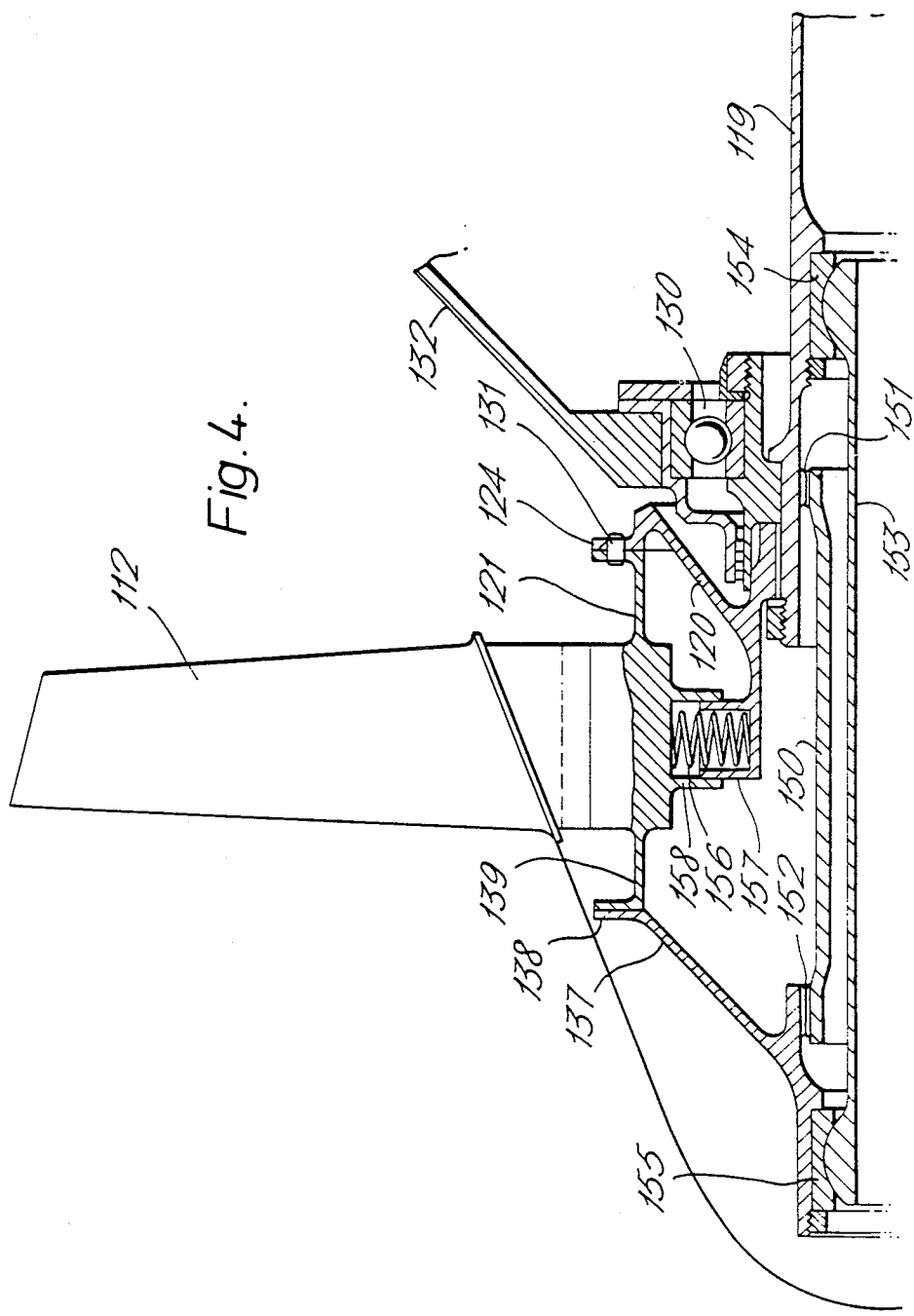

GAS TURBINE ENGINES

This application is a division of Ser. No. 748,371 filed Dec. 7, 1976 now abandoned.

This invention relates to the supporting and driving of rotors of gas turbine engines.

One of the main difficulties encountered by designers involved in the design of supporting structures and associated bearings suitable for supporting and driving rotors of gas turbine engines, and particularly large fan rotors thereof, is providing a bearing arrangement of sufficiently robust construction to support the fan when an out of balance occurs such as if a blade becomes detached from the fan whilst the engine is in operation.

The most usual way of overcoming or providing for this problem is to design a bearing arrangement which is capable of withstanding far greater loads than it is usually subjected to in normal operation. However, this results in a structure which is much heavier than is desirable, and this is of particular importance in the case of an arrangement which is intended for use in an aircraft gas turbine engine.

An object of the present invention is to provide a supporting structure which will substantially accommodate any out of balance which occurs whilst the fan is in operation and which will continue to drive the fan until the engine can be safely closed down.

According to the present invention a gas turbine engine comprises a main shaft, a first mounting structure for supporting a rotor on the shaft and including a frangible driving connection which is dimensioned to fracture when transverse loads on the rotor exceed a pre-determined magnitude, and a second mounting structure which includes a transversely flexible support and a torsionally stiff drive means interconnecting the rotor and the shaft in such a manner that, in the event of fracture of the frangible driving connection the rotor continues to be supported and driven by the second mounting structure which at the same time accommodates transverse movements of the rotor with respect to the shaft.

In one embodiment of the invention the rotor is a fan of a ducted fan gas turbine engine and the first mounting structure comprises an annular ring connected to the shaft and onto which the fan disc is mounted by means of a circumferential array of dowels, bolts or the like, all of which are designed to fracture when the out-of-balance of the fan exceeds a pre-determined value, and which constitute the frangible driving connection.

The second mounting structure may comprise at least one circumferential array of axially-extending transversely flexible struts connected between the rotor and the main shaft. The struts may connect a pair of driving rings to form a cylindrical structure with sufficient torsional rigidity to drive the rotor, but where the transverse flexibility required is such that the struts themselves can provide no torsional rigidity, the mounting structure may comprise a separate driving connection between the shaft and the rotor which is transversely flexible but torsionally rigid, for example, a cylindrical bellows.

In an alternative embodiment both the torsional rigidity for driving the fan and the transverse flexibility are provided in a single auxiliary shaft connected between the main shaft and the rotor. The auxiliary shaft may be folded back on itself several times to provide the required flexibility.

In a further alternative embodiment the transverse flexibility is provided by a spring between the rotor and the main shaft, and auxiliary shafts are provided with spherical connections at their ends to provide the drive and to provide for the take-up of end thrust.

Figure 2:
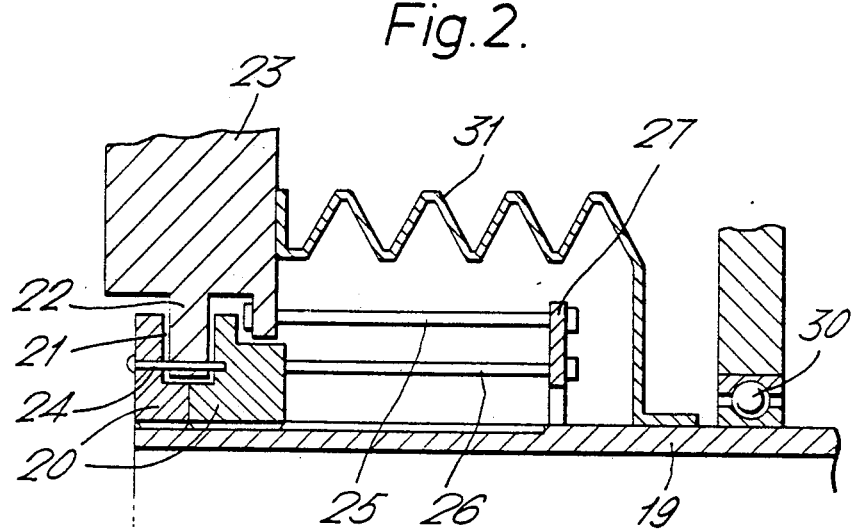

An embodiment of the invention will now be described by way of example only, and with reference to the accompanying drawings in which:

FIG. 1 shows a diagrammatic view of a ducted fan gas turbine engine having a broken away casing portion showing a diagrammatic view of an embodiment of the invention, FIG. 2 shows an enlarged cross-sectional view of the diagrammatic embodiment shown at FIG. 1 illustrating the principle of the invention, FIG. 3 shows an embodiment of the invention as applied to an actual engine; and FIG. 4 shows a further alternative embodiment of the invention in an engine design.

Referring to FIG. 1 of the drawings a ducted fan gas turbine engine is shown generally at 10 and comprises in flow series a fan 12, a low pressure compressor 13, a high pressure compressor 14, combustion equipment 15, a high pressure turbine 16, a low pressure turbine 17 and an exhaust nozzle 18. The compressors 13 and 14 and the turbines 16 and 17 are rotatably mounted upon a common shaft arrangement not shown. The mounting structure of the fan is shown generally at 9, and the fan is driven by means of a main shaft 19.

Referring to FIG. 2, a pair of mounting rings 20 is provided on the shaft 19 each of which is rigidly connected to the shaft by means of a splined connection and is locked in position by a conventional locking system not shown. The rings 20 define between them an annular groove 21 in which an annular flange 22 is located.

The primary driving connection between the main shaft and the fan disc 23 comprises a circumferential array of frangible connectors, for example, bolts or dowels 24, which pass through the two mounting rings 20 and the flange 22 thus locating the disc in both the radial and circumferential directions.

Clearly other forms of frangible connectors may be used to replace the dowels described.

During normal operaton of the fan, the fan disc 23 is both driven and supported by the ring 20 through the flange 22 and the circumferentially extending array of bolts or dowels 24. If, however, an out-of-balance force of sufficient magnitude occurs on the fan disc 23 the frangible connectors are sized such that they will fracture and the drive and support is maintained by the second mounting structure as hereinafter described.

The second mounting structure comprises two coaxial circumferential arrays of axially extending struts 25 and 25. The struts 25 connect a flange on the disc 23 to a ring 27 and the struts 26 connect the ring 27 to the rear mounting ring 20. The effect of this arrangement is to provide the equivalent transverse flexibility in the struts to that which would be produced if a single array of struts was provided in which each strut was as long as the combined length of a strut 25 and a strut 26.

In the above-described example, the torsional rigidity of the struts and ring 27 is insufficient to transmit the necessary torque from the ring 20 to the disc 23, and a cylindrical bellows 31 is used to provide the torque-transmitting function. The bellows, by virtue of its convoluted shape has transverse flexibility so that relative transverse movements between the shaft and the fan rotor do not affect the transmission of torque therebetween after the first driving connection is broken.

The length and flexibility of the struts 25 and 26 are calculated to accommodate the radial displacement of the rotor disc under the out-of-balance centrifugal effects caused by loss of a fan blade during operation of the engine and this prevents transmission of excessive additional transverse forces to the shaft bearing 30 and hence to the structure supporting the bearing.

The engine can thus be designed to withstand foregin object damage sufficient to break or dislodge a fan blade and will continue to run without disintegration for the relatively short period of time required to shut it down.

FIGS. 3 and 4 show how the invention can be applied to actual engine designs.

Referring now to FIG. 3 there is shown a fan rotor 123 which carries a plurality of fan blades 112 on its outer pheriphery. The fan is normally driven from the engine main shaft 119 through a drive cone 120 which is connected to a stub shaft 121 through a frangible joint 124. The frangible joint 124 consists of a plurality of dowels or bolts 131 which pass through adjacent flanges on the drive cone 120 and on the stub shaft 121. The bolts or dowels 131 are designed to break when an out-of-balance force greater than a specified minimum occurs on the joint.

The main shaft 119 is supported in a front bearing 130 carried in static structure 132 which is downstream of the fan so that the fan is overhung from the bearing.

In this embodiment the second mounting structure consists of an auxiliary drive shaft 125 which is of sufficient length to give the required transverse flexibility while being sufficiently torsionally stiff to provide the required drive to the fan when the frangible connection is broken. The shaft 125 is connected by splines 134 at one of its ends to the drive cone 120 and is held in place by a nut 135. At its other end the shaft 125 is connected by splines 136 to a drive cone 137 which is in turn connected through a bolted flange 138 to a second stub shaft 139 on the fan disc 123. A second nut 140 retains the drive cone 137 on the shaft 125.

It can be seen that in order to provide the transverse flexibility required while keeping the second mounting compact, the auxiliary drive shaft 125 is doubled back on itself in the form of two co-axial tubes thus halving its length. This is by no means an essential feature however, and the auxiliary drive shaft may be extended rearwards as a single cylindrical member for a sufficient length to give the required flexibility.

The above-described arrangement works in a manner identical to that diagrammatically illustrated in FIG. 2 in that when an excessive out-of-balance force is applied to the fan rotor due to a loss of blading, the frangible connection breaks and the fan rotor continues to be supported and driven by the second mounting structure. Some damping of the now eccentric movement of the fan rotor may be provided by frictional engagement of the flanges of the joint 124 but this should not be sufficient to prevent inversion of the rotor so that it rotates about an altered axis.

Referring now to FIG. 4, a construction similar to that of FIG. 3 is shown and where possible the same reference numerals have been used to indicate identical structures between the two figures.

In this construction the second mounting structure consists of a quill shaft 150 which is torsionally stiff and is connected at its ends to the main shaft 119 and to the drive cone 137 by short barrelled splines 151 and 152 respectively. In order to take the thrust of the fan when the second mounting structure is in operation the structure also includes an axially stiff tube 153 which has spherical bearing surfaces at its ends which sit in spherical recesses 154 and 155 on the main shaft 119 and on the drive cone 137 respectively. Both the shaft 150 and the tube 153 are thus able to pivot during eccentric rotation of the fan rotor when the second mounting structure is in operation.

In order to provide the transverse flexible support, spring elements 156 are included in the second mounting structure and are interposed between the drive cone 120 and the fan rotor 123. The spring elements, which may take any convenient form such as the coil springs illustrated, are enclosed in overlapping channels 157 and 158 on the drive cone 120 and the fan rotor respectively. Thus it can be seen that the fan rotor is driven and is fully supported for rotation in an inverted condition when the seond support structure is brought into operation following a blade loss in the fan. Some damping of the transverse movement can occur on the side walls of the channels 157 and 158.

Clearly there are modified forms of the above described embodiments which could be used and which would still fulfil the principle of the invention.

What is claimed is:

1. A gas turbine engine comprising
   a hollow main shaft,
   a first mounting structure for supporting a rotor from the exterior of the shaft and including
   a frangible driving connection which is dimensioned to fracture when transverse loads on the rotor exceed a predetermined magnitude, and
   a second mounting structure which includes a tubular auxiliary drive shift connected at one end to rotate with said main shaft and extending through the hollow interior of said main shaft and through an end of said main shaft to the rotor to form a transversely flexible connection between said main shaft and said rotor.

2. A gas turbine engine comprising
   a main shaft,
   a first mounting structure for supporting a rotor on the shaft and including
   a frangible driving connection which is dimensioned to fracture when transverse loads on the rotor exceed a predetermined magnitude, and
   a second mounting structure which includes a quill shaft for torque transmission having barrelled splines at each end for transmitting drive from the engine main shaft to the rotor, and
   spring means interposed between the rotor and the main shaft to allow relative transverse movements therebetween.

3. A gas turbine as claimed in claim 1 in which said tubular auxiliary drive shaft comprises two coaxial portions.

* * * * *